US006631310B1

(12) United States Patent
Leslie

(10) Patent No.: US 6,631,310 B1
(45) Date of Patent: Oct. 7, 2003

(54) WIRELESS ENGINE-GENERATOR SYSTEMS DIGITAL ASSISTANT

(75) Inventor: David S. Leslie, Wheaton, IL (US)

(73) Assignee: General Electric Company, Schenectady, NY (US)

( * ) Notice: Subject to any disclaimer, the term of this patent is extended or adjusted under 35 U.S.C. 154(b) by 438 days.

(21) Appl. No.: 09/663,452

(22) Filed: Sep. 15, 2000

(51) Int. Cl.[7] .............................................. G05B 11/00
(52) U.S. Cl. .......................... 700/292; 700/21; 700/79; 702/67; 713/340
(58) Field of Search ............................. 700/293.66, 292, 700/286, 22, 297, 168; 322/25; 361/95; 702/57, 62, 67; 713/340

(56) References Cited

U.S. PATENT DOCUMENTS

| 3,902,076 | A |   | 8/1975  | Meyers et al. .................. 307/57  |
| 4,731,547 | A |   | 3/1988  | Alenduff et al. ............... 307/47  |
| 4,755,798 | A |   | 7/1988  | Hooper ........................ 340/520 |
| 4,912,382 | A |   | 3/1990  | Koenig et al. ................ 318/563 |
| 5,390,068 | A |   | 2/1995  | Schultz et al. ................. 361/95 |
| 5,574,654 | A |   | 11/1996 | Bingham et al. ............... 702/62  |
| 5,608,657 | A |   | 3/1997  | Conway et al. .............. 700/179   |
| 5,650,936 | A |   | 7/1997  | Loucks et al. ................. 702/62 |
| 5,708,840 | A | * | 1/1998  | Kikinis et al. ............... 708/105 |
| 5,736,847 | A |   | 4/1998  | Van Doorn et al. ........... 700/45   |
| 5,754,033 | A |   | 5/1998  | Thomson ....................... 702/61 |
| 5,973,481 | A | * | 10/1999 | Thompson et al. ............. 322/7   |
| 6,055,163 | A | * | 4/2000  | Wagner et al. ................ 363/37  |
| 6,292,717 | B1| * | 9/2001  | Alexander et al. ........... 700/293  |

FOREIGN PATENT DOCUMENTS

GB    2 252 629 A    8/1992
JP    62113076       5/1987
JP    05328616       12/1993

OTHER PUBLICATIONS

Product Information Pamphlet from Basler Electric dated 6/97.
Product Information Pamphlet from ASCO.
Product Information Pamphlet entitled System 200 Generator Control; dated Jul. 1, 1997.
Engine Monitoring System/Controller with Remote Communications Capabilities by Frank W. Murphy Manufacturer; dated Jan. 11, 1999.

(List continued on next page.)

Primary Examiner—Leo Picard
Assistant Examiner—Kidest Bahta
(74) Attorney, Agent, or Firm—Karl A. Vick, Esq.; Armstrong Teasdale LLP

(57) ABSTRACT

Using a personal digital assistant (PDA) to collect operational data for analysis on computers from systems including engine-generator controllers and the downloading of operational parameters to engine-generator controllers is described. The engine-generator controllers control at least one engine-generator set. A method for using the PDA includes the steps of configuring the controller with a communications service manager to enable communications with the PDA and configuring the PDA to display engine-generator operational data. The method of collection and downloading continues by transferring operational parameters from the computer to the PDA, downloading the operational parameters from the PDA to the controller, uploading operational data from the controller to the PDA and transferring operational parameters from the PDA to the computer.

43 Claims, 2 Drawing Sheets

OTHER PUBLICATIONS

Controls & Instrumentation by Frank W. Murphy Manufacturer; Condensed Catalog No. 28.

Product Information Pamphlet entitled First In Advanced Generator Controls and Alarm Modules.

GENCON® II—Standby V1–7h High Performance Generator–Set Controller by Wexler Computer Systems Development LTD; dated 1993–1994.

Product Information Pamphlet entitled Electronic Control Equipment by Modex Automation .

Product Information Pamphlet from Deep Sea Electronics Ltd.

Decription of the AC Power Monitor System by EXOR Electronic R&D—ACPM System Nov. 21, 1997—Ver. 1.04.

Product Information Pamphlet entitled Onan by Cummins.

Product Information Pamphlet entitled The UniOP Family of Operator Interfaces by EXOR® Electronic R & D.

Product Information Pamphlet entitled The Complete Windows CE® Engine only from EXOR.

Product Information Pamphlet entitled Industrial Computers by EXOR®.

Product Information Pamphlet entitled First, a breakthrough GenSet.Now, an innovative application.

Product Information Pamphet entitled PowerCommand™ paralleling Digital MasterControl Infinite Bus Applications by Cummins Power Generation.

Product Information Pamphlet Model 50 PowerCommand™ Paralleling Interface Enclosure for Isolated bus applications by Cummins Power Generation.

Product Information Pamphlet entitled Model 100 Master-Control PowerCommand™ Paralleling for Isolated bus applications by Cummins Power Generation.

Product Information Pamphlet entitled Model 150 Power-Command™ Automatic Paralleling Interface Isolated Bus System Controller Range: 40 to 1600 kVA Sets by Cummins Power Generation.

Product Information Pamplet entitled PowerCommand™ Paralleling System Overview by Cummins Power Generation.

Product Infomation Pamphlet entitled 'Power Control'PCL System Generator Set Control by Cummins Power Generation.

Product Information Pamphlet by Turner Electric Corporation.

Product Information Pamphlet by Spectrum Detroit Diesel; Series ISAS.

Product Information Pamphlet by Spectrum Detroit Diesel; Generator Accessories.

Product Information Pamphlet entitled Onan PowerCommand Digital Paralleling Sample Specification Guide; dated Aug. 1, 1995.

Product Information Pamphlet entitled Distributed Power by Siemens dated May/Jun. 2000.

Product Information Pamphlet by Hardware Datasheet entitled Generator Power Control for Single Generator Applications.

* cited by examiner

WIRELESS ENGINE-GENERATOR SYSTEMS DIGITAL ASSISTANT

BACKGROUND OF THE INVENTION

This invention relates generally to engine-generator systems, and more particularly to control and monitoring systems for engine-generator systems.

Engine-generator sets are used to provide an on-site alternate source of electrical energy in hospitals, offices, data centers, factories, institutions, hotels and other buildings where an interruption to the utility source of power may cause unsafe situations or which may result in economic loss. In addition, engine-generator sets may be used to provide electrical energy in remote areas where there is no utility power available. Engine-generator sets may also be used as a distributed source of electrical energy to reduce a peak load on utility electrical generation systems during peak electrical demand periods, for example, during the summer.

Engine-generator sets are usually closely monitored by operation technicians who are responsible for gathering operation data, such as temperatures and pressures, from instruments located on the engine-generator set. This data is normally obtained visually, and recorded using pens or pencils on notepads or forms.

Typically the operation of an engine-generator set is controlled by an engine-generator controller. Known engine-generator controllers use microprocessors to control the operation of an engine-generator set and in some cases provide for, or have interfaces to, annunciation equipment, such as incandescent lights or light emitting diodes to display the status and operating condition of the engine-generator. Those known engine-generator controllers have limited communication capabilities through visual indicators and control and monitor the engine-generator set using hard-wired discrete control wiring. Thus, known engine-generator controllers are unable to communicate to other systems, for example, computers, actual operational parameters of the engine-generator set such as oil pressure, oil temperature, power quality for collection and analysis of engine-generator set performance. Therefore, data storage and retrieval to and from the engine-generator set is a tenuous task.

Therefore, it would be desirable to closely monitor the operational status of the controller and the engine-generator sets without the need for pens and pencils, notepads or forms.

BRIEF SUMMARY OF THE INVENTION

A method for the collection of operational data for analysis on a computer from an engine-generator controller and the downloading of operational parameters to an engine-generator controller from the computer using a personal digital assistant (PDA) is described herein.

The described method includes the steps of configuring the engine-generator controller with a service manager to enable communications with the PDA, configuring the PDA to display engine-generator set operational data and transferring operational parameters from the computer to the PDA. Further steps to the method include downloading the operational parameters from the PDA to the engine-generator controller, the upload of operational data from the engine-generator controller to the PDA and the transfer of operational data from the PDA to the computer.

DETAILED DESCRIPTION OF THE INVENTION

Figure 1:
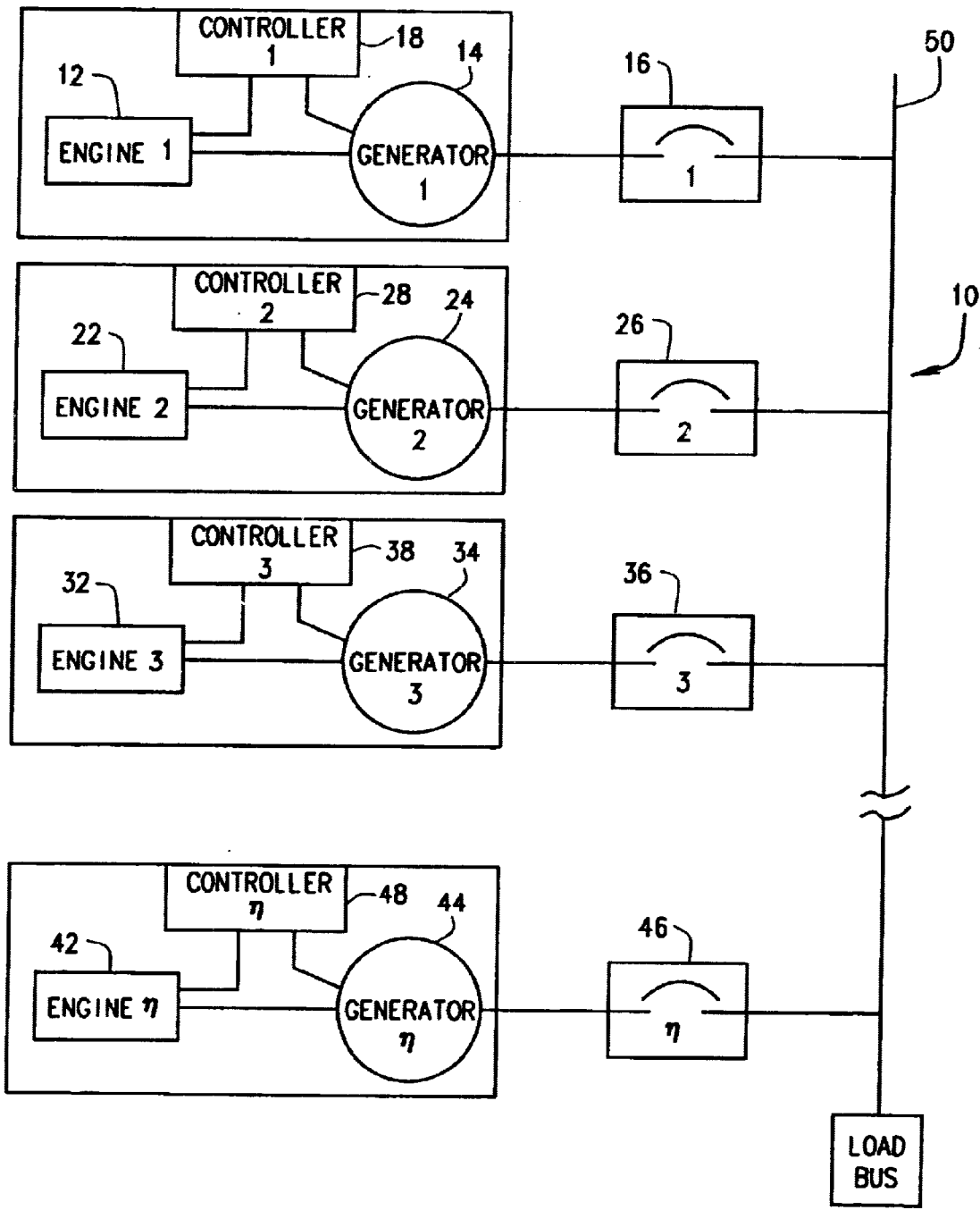
FIG. 1 is a block diagram of an electrical power generation system utilizing multiple engine-generators electrically linked together as the source of electrical energy.

Referring now to FIG. 1, there is illustrated a block diagram of an electrical power generation system 10 utilizing multiple engine-generator sets as a source of electrical energy. Each engine and electrical generator set comprises an engine, an electrical generator, a circuit breaker and a controller. In the embodiment shown in FIG. 1, n engine-generator sets are shown where the engines and generators are mechanically linked together. Circuit breakers electrically link the outputs of the n generators. Controllers are configured to control operation of the engine-generator sets and monitor operational performance of the engine-generator sets. n engine-generator sets are shown in FIG. 1 to illustrate that depending on the required capacity of the electrical power generation system there may be more or less than three engine-generator sets within the system. Again referring to FIG. 1, a first engine-generator set includes a first engine 12, a first generator 14, a first circuit breaker 16 and a first engine-generator controller 18. A second engine-generator set includes a second engine 22, a second generator 24, a second circuit breaker 26 and a second engine-generator controller 28. A third engine-generator set includes a third engine 32, a third generator 34, a third circuit breaker 36 and a third engine-generator controller 38. An $n^{th}$ engine-generator set includes an $n^{th}$ engine 42, an $n^{th}$ generator 44, an $n^{th}$ circuit breaker 46 and an $n^{th}$ engine-generator controller 48. The electrical energy of each engine-generator set is linked via circuit breakers to a common electrical bus 50 which is connected to a load bus for the distribution of electricity. In a typical engine-generator system as shown in FIG. 1, each engine-generator set is controlled and monitored using engine-generator controllers 18, 28, 38 and 48 as described below.

As shown in FIG. 1, each engine-generator set is controlled by an engine-generator controller, for example controller 18. Controller 18 communicates engine-generator set operational data, for example, run-time hours, fuel consumed, oil temperature and oil pressure to a display and receives operational parameters data from an external interface, such as a keypad.

Figure 2:
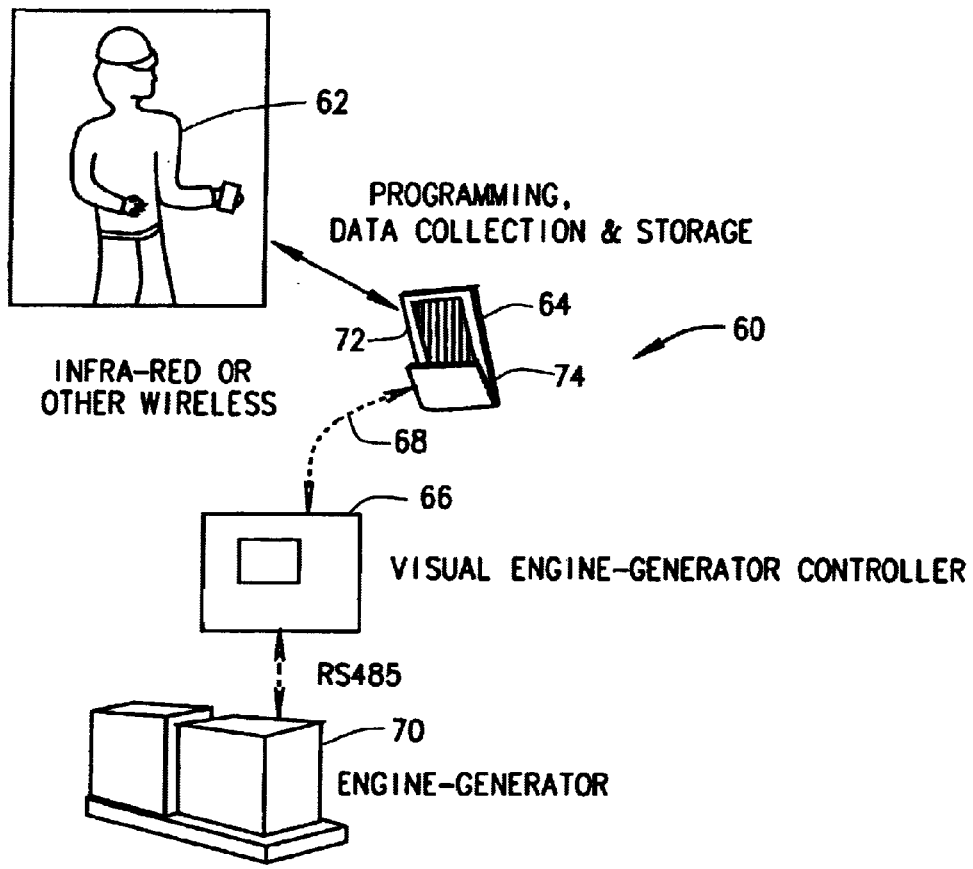
FIG. 2 is a diagram showing an engine-generator data collection system.

FIG. 2 is a diagram according to one embodiment depicting an engine-generator data collection system 60. System 60 includes an operator 62 using a personal digital assistant (PDA) 64 loaded with appropriate application software, to collect engine-generator set performance data or to configure an engine-generator set with operating parameters. As shown in system 60, PDA 64 interfaces to a visual engine-generator controller 66 via a communication interface 68. In the embodiment shown in FIG. 2, interface 68 is infra-red or another wireless interface. Visual engine-generator controller 66 communicates with an engine-generator set 70 via a bi-directional interface, in the embodiment shown, an RS-485 interface.

Personal digital assistant (PDA) 64 is configured to upload operational data from engine-generator controller 66 and download operational parameters to engine-generator controller 66. In one embodiment, engine-generator controller 66 controls at least one engine-generator set 70. PDA 64 includes a central processing unit (CPU) and memory (both not shown) for processing instructions and operation of interface 68, a display 72 for displaying engine-generator set data and a keypad 74 for entering instructions.

PDA 64 is, in one embodiment, configured to select which controller 66 and further which engine-generator set 70 are to receive operational parameters for installations that include multiple controllers 66 and/or multiple engine-generators. In addition, PDA 64 is configured to verify a successful download to the engine-generator controller using a data checking mechanism, with a display to operator 62 on display 72 to communicate successful or unsuccessful downloads. One such data checking mechanism is an engine-generator set identifier utilized to verify that the correct engine-generator set has received the downloaded operational parameters.

Other functions of PDA 64 include display of operational data uploaded from engine-generator controller 66 in chronological order on display 72. PDA 64 is further configured to allow selection of allowable ranges for the operational data and in one embodiment displays out of range operational data values in a color different than a color used for displaying data within range of operational data values. The multiple color scheme allows operator 62 to easily detect of out of range values. PDA 64 is also configurable to date and time stamp data uploaded from engine-generator controller 66. For communications between PDA 64 and engine-generator controller 66 to be enabled, engine-generator controller 66 is configured with a wireless communications service manager.

Figure 3:
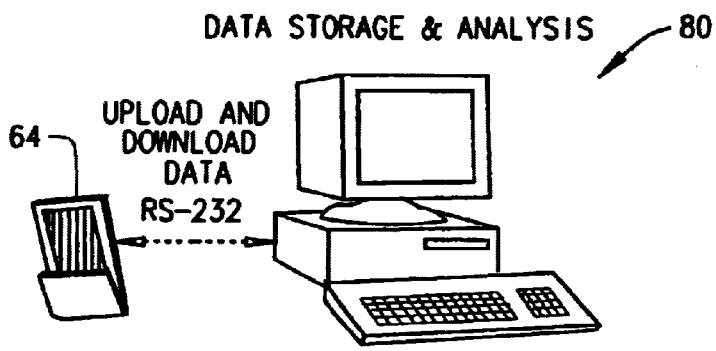
FIG. 3 is a diagram of a data transfer and analysis system.

FIG. 3 is a diagram of a data transfer and analysis system 80 according to the present invention. System 80 includes a PDA 64 as described above and a data storage and analysis subsystem 82, such as a computer configured to transfer engine-generator set operational and performance data to and from PDA 64. PDA 64 includes an interface enabling communication with subsystem 82. In one embodiment the interface is a standard RS-232 interface. Other embodiments include, but are not limited to wireless interfaces similar to interface 68 (shown in FIG. 2). Subsystem 82 is configured to store data downloaded from PDA 64 for analysis of engine-generator set performance. In addition, subsystem 82 can also transfer to PDA 64 operational parameters for eventual download to controllers 66 and engine-generators 70 (both shown in FIG. 2) as described above.

PDA 64, described above, provides wireless communication capabilities for direct communications with engine-generator controllers. PDA 64 can communicate operational configuration parameters to the controllers, and retrieve operational data and status from engine-generator sets, through the controllers. Therefore, operational status of the controller and the engine-generator sets controlled can be closely monitored accurately, without the need for pens and pencils, notepads or forms.

Use of such a system eliminates human error of known data gathering systems where data gathered is gathered in a manual fashion such as paper and pencil while providing operator interaction not seen in totally automated web-based systems, which sometimes leave an operator with uncertain conclusions as to machine performance when he or she does not actually view the machines on a regular basis.

The term microprocessor, as used herein, refers to microprocessors, microcontrollers, reduced instruction set circuits (RISC), application specific integrated circuits (ASICs), logic circuits, and any other circuit or processor capable of executing the programs described above.

While the invention has been described in terms of various specific embodiments, those skilled in the art will recognize that the invention can be practiced with modification within the spirit and scope of the claims.

What is claimed is:

1. A method for collecting operational data for analysis on a computer from and downloading operational parameters to an engine-generator controller configured to control at least one engine-generator set using a personal digital assistant (PDA), said method comprising the steps of:

transferring operational parameters from the computer to the PDA;

downloading the operational parameters from the PDA to the engine-generator controller;

uploading operational data from the engine-generator controller to the PDA; and transferring operational data from the PDA to the computer.

2. A method according to claim 1 wherein said step of downloading the operational parameters further comprises the step of selecting an engine-generator controller to receive the operational parameters.

3. A method according to claim 1 wherein said step of downloading the operational parameters further comprises the step of verifying a successful download using a data checking mechanism.

4. A method according to claim 1 wherein said step of uploading operational data further comprises the step of utilizing an engine-generator set identifier to verify that the correct engine-generator set has received the operational parameters.

5. A method according to claim 1 wherein said step of uploading operational data further comprises the step of displaying operational data in chronological order.

6. A method according to claim 1 wherein said step of uploading operational data further comprises the step of displaying operational data grouped by engine-generator set.

7. A method according to claim 1 wherein said step of configuring the personal digital assistant (PDA) further comprises the step of selecting allowable ranges for the operational data.

8. A method according to claim 7 wherein said step of selecting allowable ranges for the operational data further comprises the step of displaying out of range operational data values in a color different than a color used for displaying data having within range operational data values allowing for easy detection of out of range values.

9. A method according to claim 1 wherein said step of uploading operational data further comprises the step of displaying operational data grouped by engine-generator set.

10. A method according to claim 1 wherein said step of transferring operational parameters further comprises the step of configuring the engine-generator controller with a communications service manager to enable communications with the personal digital assistant.

11. A method according to claim 1 wherein said step of transferring operational parameters further comprises the step of configuring the personal digital assistant to display engine-generator set operational data.

12. A personal digital assistant (PDA) configured to upload operational data from an engine-generator controller controlling at least one engine-generator set, download operational parameters to the engine-generator controller and further configured to transfer engine-generator set data to and from a computer, said PDA comprising:

a central processing unit (CPU) and memory contained in a portable, handheld, battery-powered electronic computing device for processing instructions;

an interface connected to said CPU for communications with engine-generator controllers;

an interface connected to said CPU for communications with a computer;

a display for displaying engine-generator set data; and a keypad for entering instructions.

13. A PDA according to claim 12 further configured to select an engine-generator set to receive the operational parameters.

14. A PDA according to claim 12 further configured to verify a successful download to the engine-generator controller using a data checking mechanism.

15. A PDA according to claim 12 further configured to verify an engine-generator set identifier to verify the correct engine-generator set has received the downloaded operational parameters.

16. A PDA according to claim 12 further configured to display operational data uploaded from the engine-generator controller in chronological order.

17. A PDA according to claim 12 wherein said step of uploading operational data further comprises the step of displaying operational data grouped by engine-generator set.

18. A PDA according to claim 12 further configured to allow selection of allowable ranges for the operational data.

19. A PDA according to claim 18 further configured to display out of range operational data values in a color different than a color used for displaying data having within range operational data values allowing for easy detection of out of range values.

20. A PDA according to claim 12 further configured to date and time stamp data uploaded from the engine-generator controller.

21. A PDA according to claim 12 wherein said interface connected to said CPU for communications with engine-generator controllers is configured to be a wireless interface.

22. A PDA according to claim 12 wherein said interface connected to said CPU for communications with a computer is configured to be a wireless interface.

23. An engine-generator system configured for the programming of operational parameters and the collection and analysis of operational data from said system, said system comprising:

at least one engine-generator set;

an engine-generator controller configured to control said at least one engine-generator set and further configured with an interface for receiving and transmitting data from and to an external source;

a computer configured to store and analyze engine-generator set operational data and store engine-generator set parameters; and a personal digital assistant (PDA) configured to receive and transmit operational data and operational parameters to and from said computer and said engine-generator controller.

24. An engine-generator system according to claim 23 wherein said computer is configured with a spreadsheet for analysis of engine-generator set operational data.

25. An engine-generator system according to claim 23 wherein said computer is configured with a database for analysis of engine-generator set operational data.

26. An engine-generator system according to claim 23 wherein said computer is configured to print engine-generator set operational data in a report format.

27. An engine-generator system according to claim 23 wherein said engine-generator controller interface is configured to be a wireless interface.

28. An engine-generator system according to claim 23 wherein said PDA is configured to select one of said engine-generator sets to receive the operational parameters.

29. An engine-generator system according to claim 23 wherein said PDA is configured to verify a successful download to said engine-generator controller using a data checking mechanism.

30. An engine-generator system according to claim 23 wherein said PDA is configured to verify an engine-generator set identifier to verifying the correct said engine-generator set has received downloaded operational parameters.

31. An engine-generator system according to claim 23 wherein said PDA is configured to display operational data uploaded from said engine-generator controller in chronological order.

32. An engine-generator system according to claim 31 wherein said PDA is configured to display out of range operational data values in a color different than a color used for displaying data having within range operational data values allowing for easy detection of out of range values.

33. An engine-generator system according to claim 23 wherein said PDA is configured to date and time stamp data uploaded from said engine-generator controller.

34. An engine-generator system according to claim 23 wherein said computer is configured to display and store an identifier of a user who has transferred data from said PDA.

35. A portable, handheld, battery-powered electronic computing device configured to upload operational data from an engine-generator controller controlling at least one engine-generator set, download operational parameters to the engine-generator controller and further configured to transfer engine-generator set data to and from a computer, said device comprising:

a central processing unit (CPU) and memory for processing instructions;

a wireless interface connected to said CPU for communicating with engine-generator controllers when said device is proximate the engine-generator controller;

a wireless interface connected to said CPU for communications with a computer;

a display for displaying engine-generator set data; and a keypad for entering instructions.

36. A portable, handheld, battery-powered electronic computing device according to claim 35 further configured to select an engine-generator set to receive the operational parameters.

37. A portable, handheld, battery-powered electronic computing device according to claim 35 further configured to verify a successful download to the engine-generator controller using a data checking mechanism.

38. A portable, handheld, battery-powered electronic computing device according to claim 35 further configured to verify an engine-generator set identifier to verify the correct engine-generator set has received the downloaded operational parameters.

39. A portable, handheld, battery-powered electronic computing device according to claim 35 further configured to display operational data uploaded from the engine-generator controller in chronological order.

40. A portable, handheld, battery-powered electronic computing device according to claim 35 wherein said step of uploading operational data further comprises the step of displaying operational data grouped by engine-generator set.

41. A portable, handheld, battery-powered electronic computing device according to claim 35 further configured to allow selection of allowable ranges for the operational data.

42. A portable, handheld, battery-powered electronic computing device according to claim 41 further configured to display out of range operational data values in a color different than a color used for displaying data having within range operational data values allowing for easy detection of out of range values.

43. A portable, handheld, battery-powered electronic computing device according to claim 35 further configured to date and time stamp data uploaded from the engine-generator controller.

* * * * *